(12) United States Patent
Xu et al.

(10) Patent No.: US 7,471,381 B2
(45) Date of Patent: Dec. 30, 2008

(54) METHOD AND APPARATUS FOR BUMP INSPECTION

(75) Inventors: Jian Xu, Singapore (SG); Tong Liu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 70 days.

(21) Appl. No.: 11/438,698

(22) Filed: May 23, 2006

(65) Prior Publication Data

US 2007/0273874 A1    Nov. 29, 2007

(51) Int. Cl.
*G01N 21/00* (2006.01)

(52) U.S. Cl. .................. 356/237.1; 356/237.6; 356/606

(58) Field of Classification Search ... 356/237.1–237.6, 356/239.7–239.8, 606; 250/559.06–559.08, 250/201.1
See application file for complete search history.

(56) References Cited

U.S. PATENT DOCUMENTS

| 7,075,662 | B2 * | 7/2006 | Hallerman et al. | .......... 356/604 |
| 2005/0110987 | A1 * | 5/2005 | Furman et al. | ............ 356/237.4 |

FOREIGN PATENT DOCUMENTS

| JP | 06-317407 A | 11/1994 |
| JP | 11-287628 | * 10/1999 |
| JP | 11-287628 A | 10/1999 |
| JP | 2000-258354 A | 9/2000 |
| JP | 2000-356510 A | 12/2000 |

OTHER PUBLICATIONS

Patent Abstracts of Japan 2000-258354 (Sep. 22, 2000).
Patent Abstracts of Japan 2000-356510 (Dec. 26, 2000).
Patent Abstracts of Japan 11-287628 (Oct. 19, 1999).
Patent Abstracts of Japan 06-317407 (Nov. 15, 1994).

* cited by examiner

*Primary Examiner*—L. G. Lauchman
*Assistant Examiner*—Iyabo S Alli
(74) *Attorney, Agent, or Firm*—Jacobson Holman PLLC

(57) ABSTRACT

A method of dynamically imaging, calibrating and measuring bump height and coplanarity of a plurality of bumps on a surface is disclosed. The method includes illuminating the plurality of bumps with multispectral light from at least one light source, and receiving light of a first wavelength at an imaging device such that a top view image of at least a portion of the plurality of bumps is captured. The light of the first wavelength is reflected off the plurality of bumps at a first angle from the surface. Light of a second wavelength is received at the imaging device such that at least one oblique side view image of at least a portion of the plurality of bumps is captured. The light of the second wavelength is reflected off the plurality of bumps at a second angle from the surface. The captured images are processed to determine absolute bump height and coplanarity. A corresponding apparatus is also disclosed.

34 Claims, 5 Drawing Sheets

METHOD AND APPARATUS FOR BUMP INSPECTION

FIELD OF THE INVENTION

This invention relates to a method and apparatus for three dimensional inspection of bumps, and particularly, but not exclusively, to dynamic inspection of moving wafer bumps and ball grid arrays.

DEFINITION

Bump is taken to include a wafer bump and a solder ball in a ball grid array.

BACKGROUND OF THE INVENTION

Wafer bump and/or solder ball height and coplanarity inspections are commonly carried out to check for any significant unevenness and missing bumps or balls, because such defects in a component mean loss of electrical contact, leading to component failure.

Current methods include taking multiple images of a plurality of bumps on a surface of a component from different viewpoints and angles, and performing triangulation calculations on related measurements of the images to determine a three dimensional position of each bump with reference to a pre-calculated calibration plane. This is achieved by holding the component stationary while multiple exposures are made in succession to capture images from different angles using multiple cameras, or using a single camera with multiple light sources aimed at different angles on the component. Such methods are not suitable for inspecting every component produced as they need the component to be stopped momentarily for image capturing —adding to total production time and hence increasing production costs. Since only a sample group of each production batch will be inspected, defective components will still get passed if they do not happen to be in the sample group. Side view images captured by such methods are also limited in depth of view, requiring multiple exposures to be made in order to inspect the whole component if the component size is greater than the depth of view. Again, this increases inspection time.

SUMMARY

In accordance with a first preferred aspect, there is provided a method of dynamically imaging, calibrating and measuring bump height and coplanarity of a plurality of bumps on a surface, the method comprising: illuminating the plurality of bumps with multispectral light from at least one light source; receiving light of a first wavelength at an imaging device such that a top view image of at least a portion of the plurality of bumps is captured; said light of the first wavelength having been reflected off the plurality of bumps at a first angle from the surface; receiving light of a second wavelength at the imaging device such that at least one oblique side view image of at least a portion of the plurality of bumps is captured, said light of the second wavelength having been reflected off the plurality of bumps at a second angle from the surface; and processing the captured images to determine absolute bump height and coplanarity.

The method may further comprise receiving light of a third wavelength at the imaging device such that at least one oblique side view image of at least a portion of the plurality of bumps is captured, said light of the third wavelength having been reflected off the plurality of bumps at a third angle from the surface before the step of processing the captured images.

The receiving light may include reflecting light off a wavelength-selective dichroic mirror, filtering light through a wavelength-selective filter and using mirrors.

The top view and oblique side view images may be received and captured in a single exposure, and received and captured while the surface is moving.

The first angle may be 90 degrees from the surface.

The second angle and the third angle may be selected from the group consisting of: the same and different, and may be between 10° and 25° from the surface.

The imaging device may include a telecentric lens for reducing perspective distortion, and may be selected from the group consisting of: a colour CCD camera and a black and white CCD camera.

The multispectral light may be a triggerable strobe light selected from the group consisting of: a halogen light and an LED light, preferably an RGB LED light having variable brightness control for each colour.

The oblique side view image captured from the light of the second wavelength and the oblique side view image captured from the light of the third wavelength are of a portion of the plurality of bumps selected from the group consisting of: the same and different.

In accordance with a second preferred aspect, there is provided apparatus for dynamically imaging, calibrating and measuring bump height and coplanarity of a plurality of bumps on a surface, the apparatus comprising: a light source for illuminating the plurality of bumps with a multispectral light; an image capturing device; a first wavelength-selective element for guiding light of a first wavelength to the image capturing device such that a top view image of at least a portion of the plurality of bumps can be captured; said light of the first wavelength having been reflected off the plurality of bumps in a first angle from the surface; and a second wavelength-selective element for guiding light of a second wavelength to the image capturing device such that at least one oblique side view image of at least a portion of the plurality of bumps can be captured, said light of the second wavelength having been reflected off the plurality of bumps at a second angle from the surface.

The apparatus may further comprise a third wavelength-selective element for guiding light of a third wavelength to the image capturing device such that at least one oblique side view image of at least a portion of the plurality of bumps can be captured, said light of the third wavelength having been reflected off the plurality of bumps at a third angle from the surface.

The wavelength-selective elements may be selected from the group consisting of: a dichroic mirror and a filter.

The top view and oblique side view images may be captured in a single exposure, and captured while the surface is moving.

The first angle may be 90 degrees from the surface.

The second angle and the third angle may be selected from the group consisting of: the same and different, and may be between 10° and 25° from the surface.

The imaging device may include a telecentric lens for reducing perspective distortion, and may be selected from the group consisting of: a colour CCD camera and a black and white CCD camera.

The light source may be a triggerable strobe light selected from the group consisting of: a halogen light and an LED light, preferably an RGB LED light having variable brightness control for each colour.

The oblique side view image captured from the light of the second wavelength may be of a different portion of the plurality of bumps from the oblique side view image captured from the light of the third wavelength.

Multiple oblique side view images of a same at least a portion of the plurality of balls as viewed from different angles may be captured.

The apparatus may further comprise a plurality of mirrors for guiding light to the imaging device.

BRIEF DESCRIPTION OF THE DRAWINGS

In order that the present invention may be fully understood and readily put into practical effect, there shall now be described by way of non-limitative example only preferred embodiments of the present invention, the description being with reference to the accompanying illustrative drawings.

In the drawings.

DETAILED DESCRIPTION OF THE PREFERRED EMBODIMENTS

Figure 1:
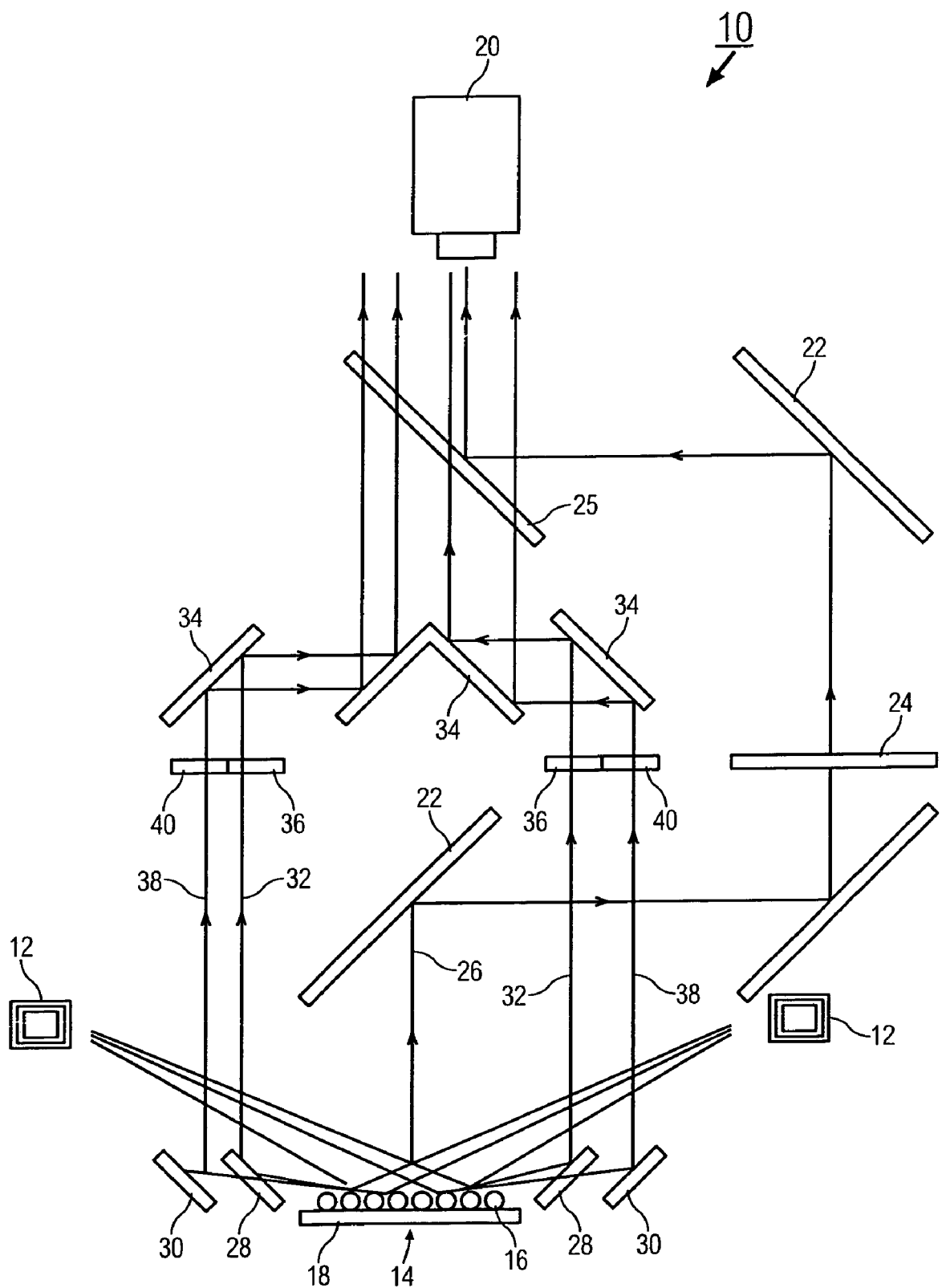
FIG. 1 is a schematic view of an apparatus for three-dimensional dynamic inspection of bumps.

According to one aspect, there is provided an apparatus 10 for dynamic three-dimensional inspection of bumps as shown in FIG. 1. The apparatus 10 comprises at least one colour light source 12 for illuminating a component 14 having a plurality of bumps 16 disposed on a surface 18. The component 14 can be for example a wafer bump or ball grid array (BGA) device. The colour light source 12 may be an LED light, a halogen light or other triggerable light source. Preferably, the colour light source 12 comprises red, green and blue light emitting diodes (LEDs) for providing light of respective wavelengths of 50% point at 580 nm, 485 nm and 475 nm, and has separate brightness control for light of each wavelength. Multispectral light comprising a plurality of different wavelengths (e.g. red, green and blue light) from the light source 12 is projected onto the plurality of bumps 16 at a low oblique angle, incident at preferably between 10° to 25° from the surface 18.

The apparatus 10 further comprises an imaging device 20, a plurality of mirrors 22, at least one filter 24 selective for light of a first wavelength, and at least one dichroic mirror 25 selective for light of the first wavelength. The imaging device 20 may be a colour CCD camera, typically a 3CCD colour camera preferably having a resolution of 1024×1024 pixels. For high speed image capturing, a camera link colour camera with high frame rate may be used. A telecentric lens may be attached to the camera to reduce perspective distortion.

Figure 2:
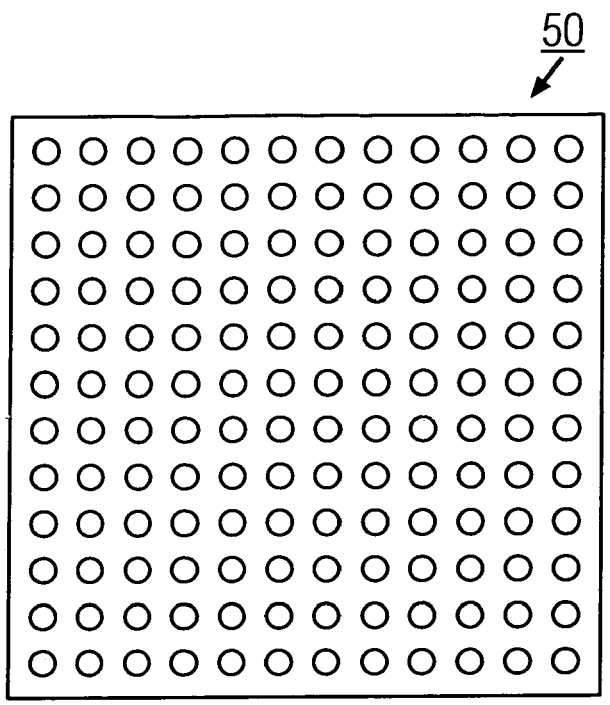
FIG. 2 is a top view image of a plurality of bumps from a first embodiment of the invention.

In a first embodiment, light of the first wavelength is green light, so the filter 24 and dichroic mirror 25 should both be selective for only green light. Arrowed line 26 shows the path of the green light to the camera 20 after the green light has been reflected off at least a portion of the plurality of bumps 16 at about 90° from the surface 18. The green light is guided by the mirrors 22, passed through the green filter 24 and reflected off the green dichroic mirror 25 before being received by the camera 20 and captured as a green top view image 50 by a green channel of the colour CCD camera, as shown in FIG. 2. In this embodiment, twelve columns of bumps are captured. The top view image 50 provides information that can be used for two dimensional bump inspection including bridging and missing bumps, abnormal bump sizes, misplacement of bumps, and also information for three dimensional triangulation calculations. The bumps in the top view image 50 appear generally circular in shape.

Figure 3:
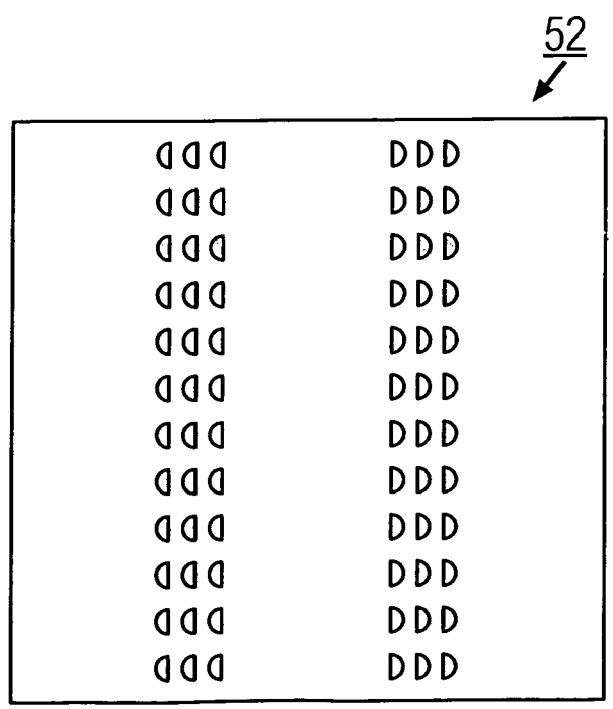
FIG. 3 is an oblique side view image of a portion of the plurality of bumps of FIG. 2.

The apparatus 10 also comprises at least one dichroic mirror 28 selective for light of a second wavelength, and at least one dichroic mirror 30 selective for light of a third wavelength. In this embodiment, light of the second wavelength is red light, and red dichroic mirrors 28 are provided to reflect only red light, while allowing light of other wavelengths to pass through. Light of the third wavelength is blue light; likewise, at least one blue dichroic mirror 30 is provided to reflect only blue light while allowing passage of light of other wavelengths Arrowed lines 32 shows the path of the red light to the camera 20 after the red light has been reflected off at least a portion of the plurality of bumps 16 at an angle of about 10-25° from the surface 18. The red light is reflected off red dichroic mirrors 28, guided by a plurality of mirrors 34 and passed through a red filter 36 before being received by the camera 20 and captured as a first oblique side view image 52 by a red channel of the colour CCD camera, as shown in FIG. 3.

Figure 4:
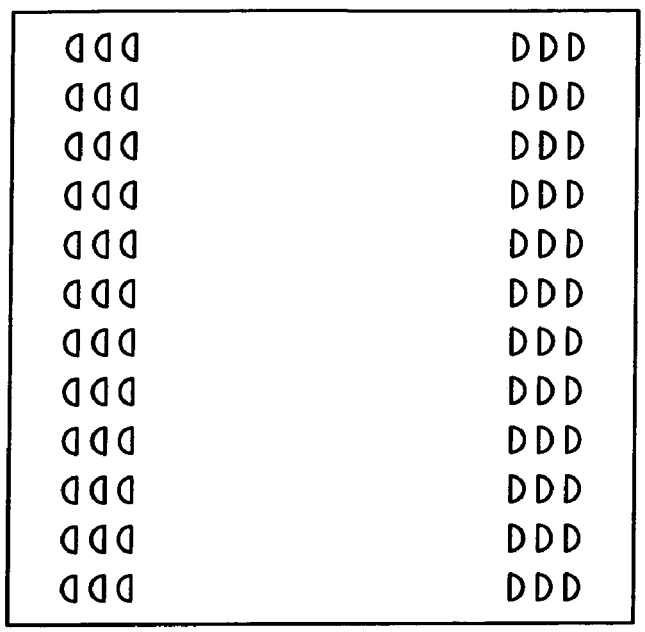
FIG. 4 is an oblique side view image of a portion of the plurality of bumps of FIG. 2, different from the portion of the plurality of bumps of FIG. 3.

Similarly, arrowed lines 38 shows the path of the blue light to the camera 20 after the blue light has been reflected off at least a portion of the plurality of bumps 16 at an angle of about 10-25° from the surface 18. The blue light is reflected off blue dichroic mirrors 30, guided by the same mirrors 34 and passed through a blue filter 40 before being received by the camera 20 and captured as a second oblique side view image 54 by a blue channel of the colour CCD camera, as shown in FIG. 4.

In the oblique side view images 52, 54, the bumps appear crescent-shaped. In this embodiment, the bumps captured in oblique side view image 52 are different from the bumps captured in oblique side view image 54. The red oblique side view image 52 shows bumps corresponding to the central six columns of bumps shown in top view image 50, while the blue oblique side view image 54 corresponds to the three extreme left columns and three extreme right columns of bumps in top view image 50.

By adjusting distances between the dichroic mirrors 25, 28, 30 and the plurality of bumps 16, optical path lengths of the different coloured lights can be kept the same. This is to allow simultaneous capturing of the corresponding images 50, 52, 54 from different angles and viewpoints in a single exposure typically taking 10 to 50 micro seconds.

The apparatus 10 may further include a position sensor (not shown) for detecting presence of the component 14 so as to trigger the light source 12 and the camera 20 for synchronised image capturing. Image grabbers, a strobe light control box, and a display device may also be included.

It should be noted that multispectral light is scattered by the plurality of bumps 16 when the component 14 is illuminated by multispectral light. However, by strategically positioning the wavelength selective dichroic mirrors 25, 28, 30, filters 24, 36, 40, and plurality of guiding mirrors 22, 34, the camera 20 receives light of only one particular wavelength that has been reflected off the plurality of bumps 16 at a particular angle and viewpoint, such that an image of only one colour from that particular angle and viewpoint is captured. Light of other wavelengths that are reflected at the same angle and viewpoint are prevented by the dichroic mirrors 25, 28, 30 and wavelength selective filters 24, 36, 40 from reaching the camera 20.

For example, the top view image 50 is composed only of green light, because the green filter 24 and green dichroic mirror 25 prevent blue and red light from multispectral light that was reflected at 90° off the plurality of bumps 16 from reaching the camera 20. Each image captured from a particular angle and viewpoint is thus of a different colour from another image captured from a different angle and viewpoint. Multiple corresponding images that overlap on a same focal plane of the camera can thus be simultaneously captured using only one camera, while each image can be distinguished from the other images by its own separate colour during image processing and analysis.

Figure 5:
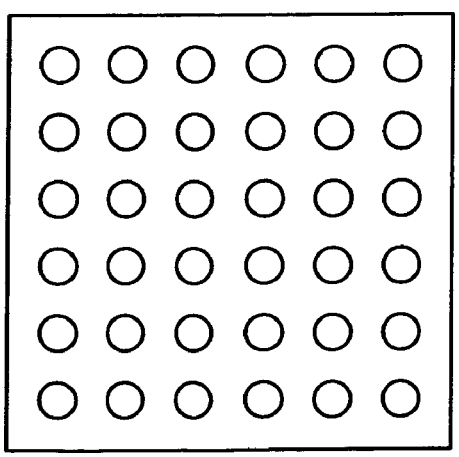
FIG. 5 is a top view image of a plurality of bumps from a second embodiment of the invention.
Figure 6:
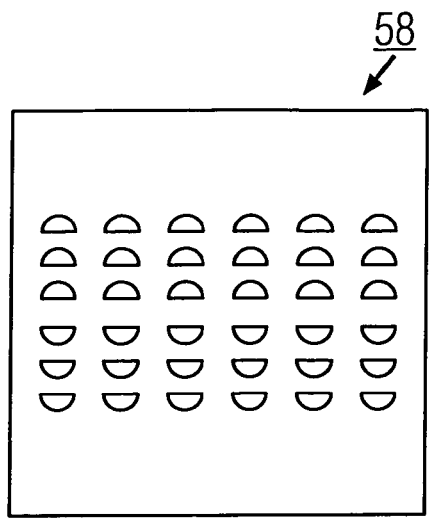
FIG. 6 is an oblique side view image of the plurality of bumps of FIG. 5.
Figure 7:
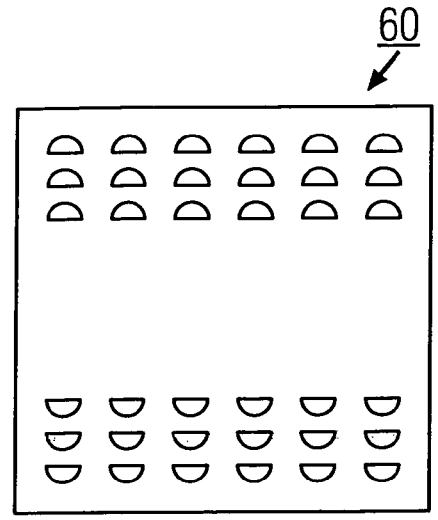
FIG. 7 is another oblique side view image of the plurality of bumps of FIG. 6.

By varying the number and position of dichroic mirrors selective for different wavelengths, other embodiments of the invention may be readily obtained. For example, the dichroic mirrors 28, 30 can be placed on opposite sides of a plurality of bumps such that a green top view image 56 (FIG. 5) and red and blue oblique side view images 58, 60 (FIGS. 6 and 7) each show the same plurality of bumps, albeit from different angles and viewpoints. A plurality of oblique side view images is thus captured for each individual bump, allowing a greater number of coplanarity results to be obtained. This improves measurement accuracy when the greater numbers of results are averaged.

Figure 8:
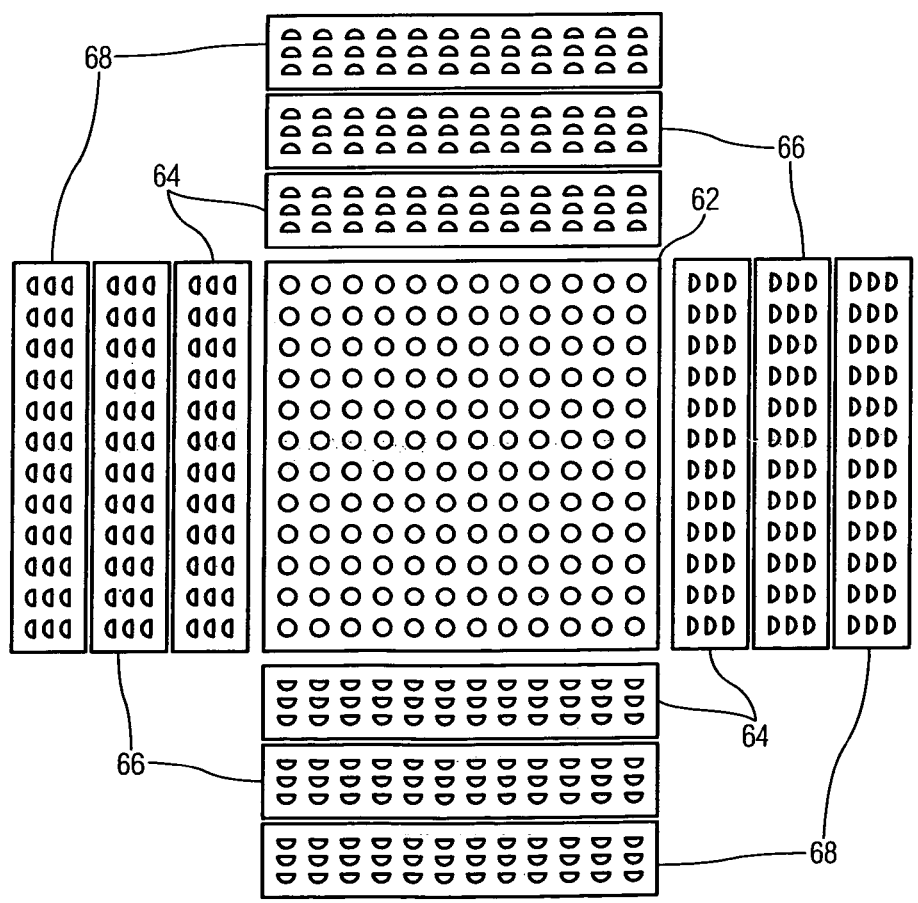
FIG. 8 is a combination of a top view image and oblique side view images of a plurality of bumps from a third embodiment of the invention.

FIG. 8 shows yet another embodiment of the invention, wherein the imaging device 20 is a 2K×2K black and white CCD camera, and the dichroic mirrors 25, 28, 30 are placed on all four sides of the component 14. Because the black and white CCD camera has no colour channels, multiple corresponding images must not be allowed to overlap on a same focal plane because they cannot later be distinguished from one another by colour during image processing and analysis. However, this embodiment allows a larger total inspection area to be covered by the camera, with multispectral light forming a top view image 62, and red, blue and green light forming respective oblique side view images 62, 64, 68 of the plurality of bumps on each side of the top view image.

Figure 9:
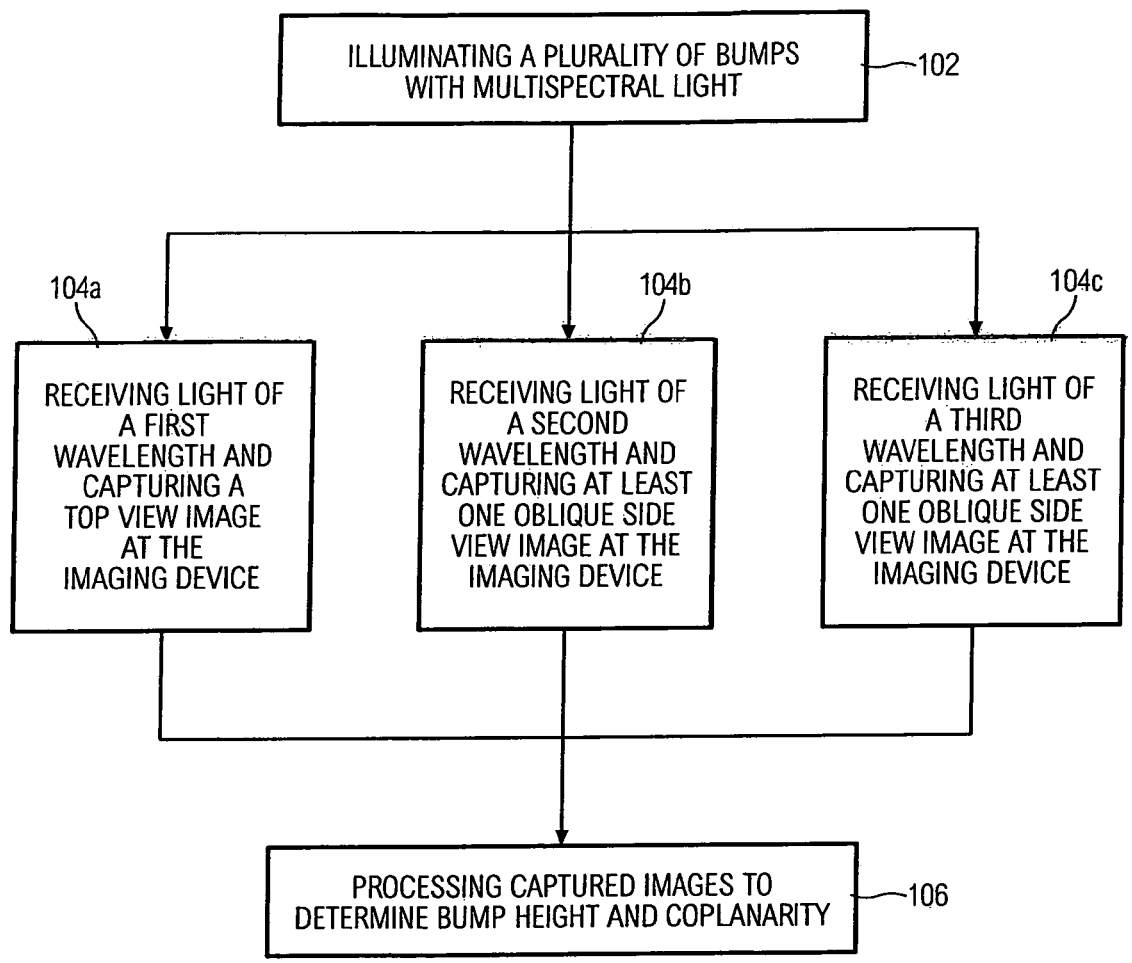
FIG. 9 is a flowchart of a method for three-dimensional dynamic inspection of bumps.

FIG. 9 shows a method 100 of dynamic inspection of bumps using the apparatus described in the earlier FIGS. 1 to 8. The method 100 comprises a step 102 of illuminating the plurality of bumps 16 with multispectral light from the light source 12, and steps 104*a*, 104*b*, 104*c* of receiving light of different wavelengths at the CCD camera 20, wherein light of a particular wavelength has been reflected off the plurality of bumps 16 at a particular angle and viewpoint. Top view and oblique side view images of at least a portion of the plurality of bumps 16 can thus be captured by the camera 20. Preferably, the images are captured simultaneously. The captured images are then processed in another step 106 to determine bump height and coplanarity. Although it is preferable to capture multiple oblique side view images of more than one colour, the invention may include capturing oblique side view images of only one colour.

The described embodiments of the invention allow dynamic imaging of the bumps using only one camera, wherein the component 14 does not have to be stopped momentarily for multiple images to be captured. The multiple images can be captured simultaneously in a single exposure while the component is on the move. This can greatly cut down inspection time, and allow inspection of every component that is produced without adding to production time and costs. The invention also allows imaging of a larger side view inspection area without suffering from out of focus problems due to tilted viewing angles. Side view focal range can be enlarged over current methods by providing multiple dichroic mirrors selective for light of different wavelengths in order to increase depth of view. By having a sufficient number of dichroic mirrors to cover all the bumps on a component, the whole component can be inspected in a single exposure, reducing inspection time when compared to the multiple exposures needed using current methods.

Whilst there has been described in the foregoing description a preferred embodiment of the present invention, it will be understood by those skilled in the technology concerned that many variations or modifications in details of design or construction may be made without departing from the present invention.

The invention claimed is:

1. A method of dynamically imaging, calibrating and measuring bump height and coplanarity of a plurality of bumps on a surface, the method comprising:
   a) illuminating the plurality of bumps with multispectral light from at least one light source such that light of a first wavelength of the multispectral light is reflected off the plurality of bumps at a first angle from the surface and light of a second wavelength of the multispectral light is reflected off the plurality of bumps at a second angle from the surface;
   b) guiding reflected light of the first wavelength to an imaging device;
   c) capturing a top view image of at least a portion of the plurality of bumps with the imaging device using the reflected light of the first wavelength received by the imaging device;
   d) guiding reflected light of the second wavelength to the imaging device;
   e) capturing at least one oblique side view image of at least a portion of the plurality of bumps with the imaging device using the reflected light of the second wavelength received by the imaging device; and
   f) processing the captured images to determine absolute bump height and coplanarity.

2. The method of claim 1, wherein the step (a) further comprises illuminating the plurality of bumps with the multispectral light such that light of a third wavelength of the multispectral light is reflected off the plurality of bumps at a third angle from the surface, the method further comprising;
   guiding reflected light of the third wavelength to the imaging device: and
   capturing at least one oblique side view image of at least a portion of the plurality of bumps with the imaging device using the reflected light of the third wavelength received by the imaging device, before the step (f) of processing the captured images.

3. The method of claim 1, wherein the steps (b) and (d) of guiding the light includes reflecting light off a wavelength-selective dichroic mirror.

4. The method of claim 1, wherein the steps (b) and (d) of guiding light includes filtering light through a wavelength-selective filter.

5. The method of claim 1, wherein the step (b) and (d) of guiding light includes using mirrors.

6. The method of claim 1, wherein the top view and oblique side view images are received by the imaging device and captured in a single exposure.

7. The method of claim 1, wherein the top view and oblique side view images are received by the imaging device and captured while the surface is moving.

8. The method of claim 1, wherein the first angle is 90 degrees from the surface.

9. The method of claim 2, wherein the second angle and the third angle are the same.

10. The method of claim 2, wherein the second angle and the third angle are between 10° and 25° from the surface.

11. The method of claim 1, wherein the imaging device includes a telecentric lens for reducing perspective distortion.

12. The method of claim 1, wherein the imaging device is selected from the group consisting of: a colour CCD camera and a black and white CCD camera.

13. The method of claim 1, wherein the multispectral light is a triggerable strobe light selected from the group consisting of: a halogen light and an LED lights.

14. The method of claim 2, wherein the oblique side view image captured from the light of the second wavelength and the oblique side view image capture from the light of the third wavelength are of a portion of the plurality of bumps.

15. The method of claim 2, wherein the second angle and the third angle are different.

16. The method of claim 2, wherein the oblique side view image captured from the light of the second wavelength and the oblique side view image captured from the light of the third wavelength are of a different portion of the plurality of bumps.

17. An apparatus for dynamically imaging, calibrating and measuring bump height and coplanarity of a plurality of bumps on a surface, the apparatus comprising:
    illumination means for illuminating the plurality of bumps with a multispectral light such that a first wavelength of the multispectral light is reflected off the plurality of bumps at a first angle from the surface and a second wavelength of the multispectral light is reflected off the plurality of bumps at a second angle from the surface;
    first wavelength-selective guide means for guiding reflected light of the first wavelength;
    second wavelength-selective guide means for guiding reflected light of the second wavelength; and
    image capturing means for capturing a top view image of at least a portion of the plurality of bumps from reflected light of the first wavelength received by the image capturing means from the first wavelength-selective guide means, and for capturing at least one oblique side view image of at least a portion of the plurality of bumps from reflected light of the second wavelength received by the image capturing means from the second wavelength-selective guide means.

18. The apparatus of claim 17, wherein the illumination means performs the further function of illuminating the plurality of bumps such that a third wavelength is reflected off the plurality of bumps at a third angle from the surface;
    wherein the apparatus further comprises third wavelength-selective guide means for guiding reflected light of the third wavelength; and
    wherein the image capturing means performs the further function of capturing at least one oblique side view image of at least a portion of the plurality of bumps from reflected light of the third wavelength received by the image capturing means from the third wavelength-selective guide means.

19. The apparatus of claim 17, wherein the LED light includes an RGB LED light having variable brightness control for each colour.

20. The apparatus of claim 17, wherein the second angle and the third angle are different.

21. The apparatus of claim 17, wherein the light source is a triggerable strobe light selected from the group consisting of: a halogen light and an LED light.

22. The apparatus of claim 18, wherein the oblique side view image captured from the light of the second wavelength is of a different portion of the plurality of bumps from the oblique side view image captured from the light of the third wavelength.

23. The apparatus of claim 17, wherein the wavelength-selective elements are selected from the group consisting of: a dichroic mirror and a filter.

24. The apparatus of claim 17, wherein the top view and oblique side view images can be captured in a single exposure.

25. The apparatus of claim 17, wherein the top view and oblique side view images can be captured while the surface is moving.

26. The apparatus of claim 17, wherein the first angle is 90 degrees from the surface.

27. The apparatus of claim 18, wherein the second angle and the third angle are the same.

28. The apparatus of claim 18, wherein the second angle and the third angle are between 10° and 25° from the surface.

29. The apparatus of claim 17, wherein the imaging device includes a telecentric lens for reducing perspective distortion.

30. The apparatus of claim 17, wherein the imaging device is selected from the group consisting of: a colour CCD camera and a black and white CCD camera.

31. The apparatus of claim 21, wherein the LED light includes an RGB LED light having variable brightness control for each colour.

32. The apparatus of claim 17, further comprising means for processing the captured images to determine absolute bump height and coplanarity.

33. The apparatus of claim 17, wherein multiple oblique side view images of a same at least a portion of the plurality of balls as viewed from different angles can be captured.

34. The apparatus of claim 17, further comprising a plurality of mirrors for guiding light to the imaging device.

* * * * *